C. L. LAWRANCE.
BIG END CONSTRUCTION FOR MOTORS.
APPLICATION FILED MAY 7, 1920.
1,404,618.
Patented Jan. 24, 1922.
2 SHEETS—SHEET 1.
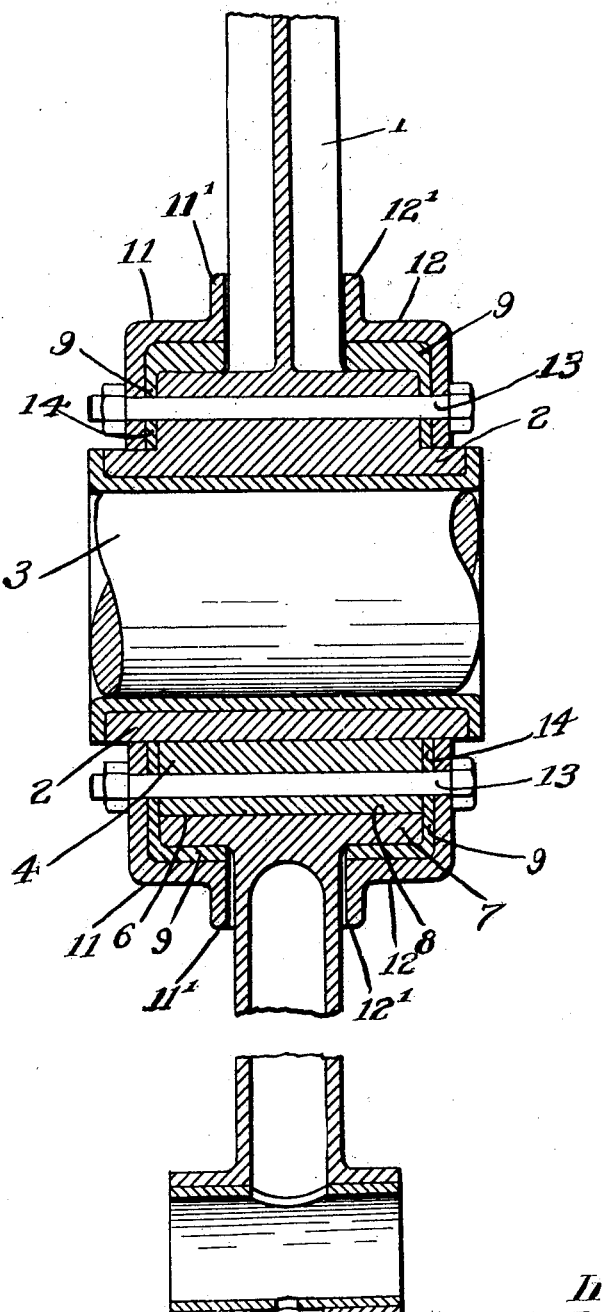
Inventor
Charles L. Lawrance
By Ellis Spear Jr.
Attorney

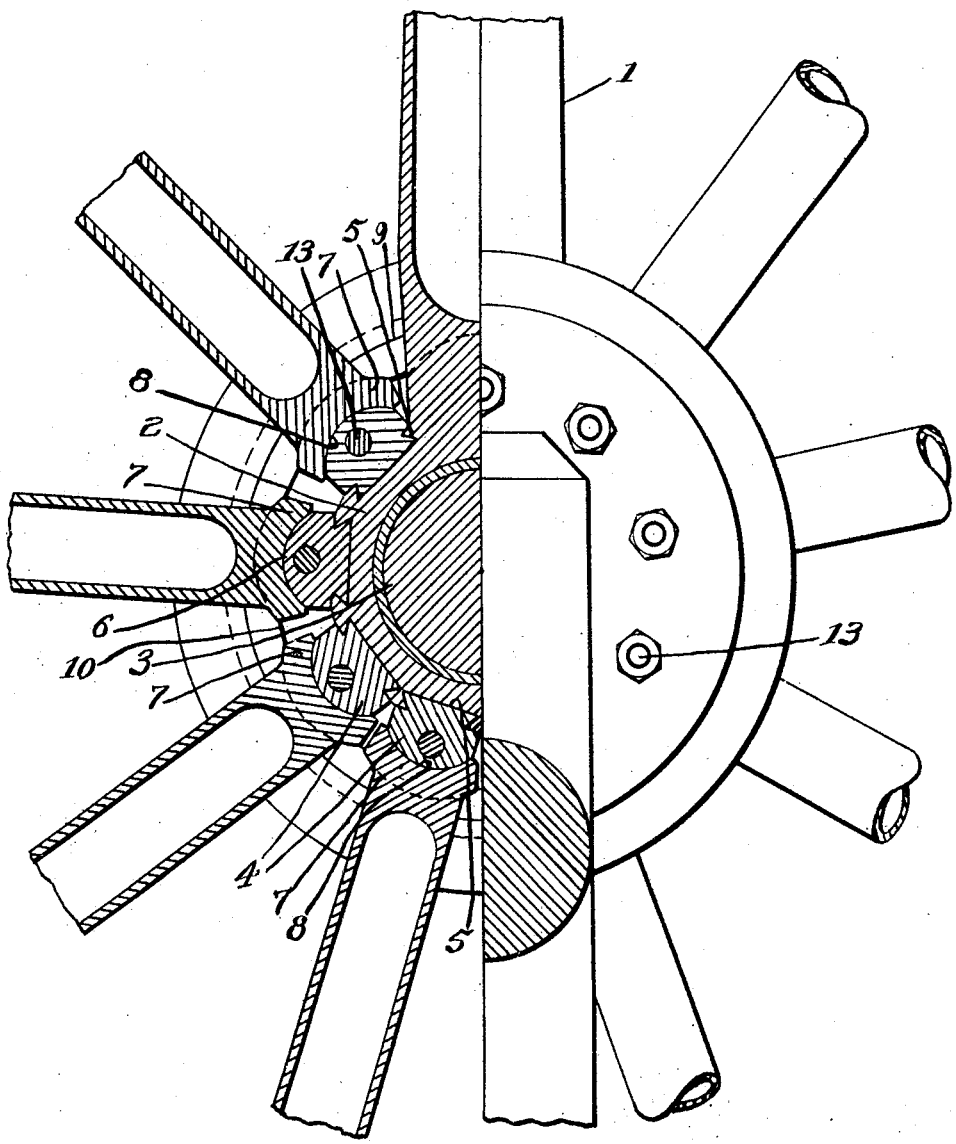

UNITED STATES PATENT OFFICE.

CHARLES L. LAWRANCE, OF BAY SHORE, LONG ISLAND, NEW YORK, ASSIGNOR TO LAWRANCE AERO ENGINE CORPORATION, A CORPORATION OF NEW YORK.

BIG END CONSTRUCTION FOR MOTORS.

1,404,618.  Specification of Letters Patent.  Patented Jan. 24, 1922.

Application filed May 7, 1920. Serial No. 379,586.

*To all whom it may concern:*

Be it known that I, CHARLES L. LAWRANCE, a citizen of the United States, residing at Bay Shore, Long Island, county of Suffolk, State of New York, have invented certain new and useful Improvements in Big End Constructions for Motors, of which the following is a specification.

In the articulation of connecting rods disposed about a common crank shaft, one of the features most difficult to effect in practical design has been the articulation of the rod ends on the common crank pin bearing which is to receive the thrust.

The present invention contemplates the improvement of this connection by the provision of a novel type of articulation which while presenting the freedom of the usual knuckle pin construction affords a much larger individual bearing for each connecting rod without increasing the distance of the centers of articulation from the axis of the crank pin. These two factors have been the elements which engineers have sought to relate in such a way as to get maximum bearing surface and strength without unduly increasing the orbit of the wrist pin centers as all increases in such orbit increases the rocking action on the small end of the connecting rod which is guided in the cylinder. This rocking action throws the line of thrust of each auxiliary rod through a point some distance from the center of the crank pin tending to bend the master rod and causing greater wall pressure on the cylinders and in some cases causing the fouling of the rods against the lower edge of the cylinder walls. This has compelled makers of engines of this type to make the knuckle pins as small as possible with the result that in many instances there has not been sufficient bearing surface.

In the present invention the usual knuckle joint principle involved has been departed from and a joint of novel character has been provided which possesses the advantages of the old knuckle joint without having its limitations. In fact, as will appear hereinafter, the new form of articulation permits an assembly on a very small radius and bearings larger than the usual maximum size of knuckle pin considered possible.

As illustrative of the present invention there is shown in the accompanying drawings a form well adapted to practical use and which will be employed in this case as a means of explaining the principles involved in the present invention. While therefore this particular construction will be described in considerable detail, and various features of such detail claimed, it is not to be understood that this invention is limited to the particular form shown. Throughout the specification and drawings like reference characters are employed to indicate corresponding parts, and in the drawings:

Fig. I is a view of an engine crank with the big end assembly in section, and

Fig. II shows an end view of such assembly partly in section.

In the form shown in the drawings just described, a master rod is indicated at 1 carrying a ring 2 which has suitable bearing on the crank pin 3. The bearing ring 2 is provided with dove tail recesses distributed as desired about its periphery and disposed longitudinally and into these grooves are slid blocks 4 having dove tail inner portions 5 and rounded outer portions 6. These rounded outer portions form of the outer face of the block elongated surfaces which constitute portions of cylinders of a radius which may be very much greater than that of any ordinary knuckle pin construction. At the same time using only a portion of a cylinder the members 4 may be assembled close together and at a very short radial distance from the center of the crank pin. The rod feet 7 are formed with lower bearing surfaces 8 of the same radius as the radius of cylindricity of the blocks 4. Over the ends of the feet 7 on each side of the bearing is slipped a ring 9 which is scalloped as indicated at 10 to hold the feet in place and in contact with the bearing blocks. Over the ring 9 on each side are inserted two lateral members 11 and 12 each provided with a flange $11^1$ and $12^1$, respectively, which define a slot for the free action of the connecting rods in their rocking movement during each stroke. The members 11 and 12 are held in place and the whole construction unified by bolts 13 which pass through the side members 11 and 12 through an intermediate surrounding ring 14 and each one passing through one of the bearing blocks or members 4. It is to be noted that while these bolts 13 have somewhat the appearance of the usual knuckle pin they are not in fact knuckle pins at all, but are only slender bolts holding the general assembly together and not being subject to any of the thrust which is taken up by the block 4 which finds ample footing in its long dove tail bearing in the main bearing ring 2 of the master rod 1.

The above construction affords therefore maximum bearing surface for each rod foot in an articulation which is capable of short radius assembly so that each rod is footed close to the central axis of the crank pin and has a broad easy bearing of large diameter to take its thrust and accommodate its motion.

Various modifications may obviously be made in the construction and arrangement of parts and in the manner of assembly, holding and mounting, all without departing from the spirit of the invention if within the limits of the appended claims.

What I therefore claim and desire to secure by Letters Patent is:

1. In a big end construction, a crank pin sleeve, a plurality of longitudinal bearing blocks having convex cylindric outer surfaces spaced about the same, connecting rods each having a laterally extended foot of concave cylindricity corresponding to that of its block bearing, and a ring on each side of said sleeve and having foot receiving scalloped recesses.

2. In a big end construction, a crank pin sleeve, a plurality of longitudinal bearing blocks having convex cylindric outer surfaces spaced about the same, connecting rods each having a laterally extended foot of concave cylindricity corresponding to that of its block bearing, a ring on each side of said sleeve and having foot receiving scalloped recesses and a retaining ring on each side of said sleeve and enclosing said assembly.

3. In a big end construction, a crank pin sleeve, a plurality of longitudinal bearings having cylindric outer surfaces spaced about the same, connecting rods each having a laterally extended foot of cylindricity corresponding to that of its bearing, and a ring on each side of said sleeve, and having foot receiving scalloped recesses.

4. In a big end construction, a crank pin sleeve, a plurality of longitudinal bearings having cylindric outer surfaces spaced about the same, connecting rods each having a laterally extended foot of cylindricity corresponding to that of its bearing, a ring on each side of said sleeve and having foot receiving scalloped recesses and a retaining ring on each side of said sleeve and enclosing said assembly.

5. In a big end construction, a crank pin sleeve, a plurality of convex cylindric bearings spaced about the same and connecting rods each having a foot of concave cylindricity corresponding to that of its block bearing.

6. In a big end construction, a crank pin sleeve, a plurality of convex cylindric bearings spaced about the same, connecting rods each having a foot of concave cylindricity corresponding to that of its block bearing, and a retaining ring on each side of said sleeve for retaining said assembly.

7. In a big end construction, a crank pin having an annular series of spaced recesses, bearing members having their inner faces formed to snugly fit said recesses and their outer faces convexed, connecting rods having their inner ends concaved to conform to the convexity of the outer faces of said bearing members, and a retainer for said assembly.

In testimony whereof I affix my signature in presence of two witnesses.

CHARLES L. LAWRANCE.

Witnesses:
JOSEPH WERTZHEISER,
HARRY E. RADACK.